United States Patent
Li et al.

(10) Patent No.: US 8,108,826 B2
(45) Date of Patent: Jan. 31, 2012

(54) CODE-COVERAGE GUIDED PRIORITIZED TEST GENERATION

(75) Inventors: Juan Jenny Li, Basking Ridge, NJ (US); David Mandel Weiss, Long Valley, NJ (US); Howell Stephen Yee, Highlands Ranch, CO (US)

(73) Assignee: Avaya Inc., Basking Ridge, NJ (US)

( * ) Notice: Subject to any disclaimer, the term of this patent is extended or adjusted under 35 U.S.C. 154(b) by 2313 days.

(21) Appl. No.: 10/953,849

(22) Filed: Sep. 29, 2004

(65) Prior Publication Data

US 2006/0070048 A1 Mar. 30, 2006

(51) Int. Cl.
G06F 9/44 (2006.01)
G06F 9/45 (2006.01)

(52) U.S. Cl. ......... 717/106; 717/132; 717/144; 717/156

(58) Field of Classification Search .................... None
See application file for complete search history.

(56) References Cited

U.S. PATENT DOCUMENTS

| | | | | |
|---|---|---|---|---|
| 5,297,150 | A * | 3/1994 | Clark | 714/26 |
| 5,737,609 | A | 4/1998 | Reed et al. | |
| 5,758,061 | A | 5/1998 | Plum | |
| 6,233,733 | B1 * | 5/2001 | Ghosh | 717/118 |
| 6,249,882 | B1 | 6/2001 | Testardi | |
| 6,601,018 | B1 | 7/2003 | Logan | |
| 6,637,026 | B1 * | 10/2003 | Chen | 717/151 |
| 6,804,634 | B1 * | 10/2004 | Holzmann et al. | 703/2 |
| 6,823,507 | B1 * | 11/2004 | Srinivasan et al. | 717/152 |
| 6,848,100 | B1 * | 1/2005 | Wu et al. | 717/157 |
| 7,584,455 | B2 * | 9/2009 | Ball | 717/124 |
| 7,620,946 | B2 * | 11/2009 | Russell | 717/157 |
| 7,650,590 | B2 * | 1/2010 | Bender | 717/106 |
| 7,757,219 | B2 * | 7/2010 | Ball et al. | 717/132 |
| 7,861,226 | B1 * | 12/2010 | Episkopos et al. | 717/124 |
| 7,886,272 | B1 * | 2/2011 | Episkopos et al. | 717/124 |
| 7,886,283 | B2 * | 2/2011 | Nacul et al. | 717/137 |
| 7,945,898 | B1 * | 5/2011 | Episkopos et al. | 717/124 |
| 2004/0226006 | A1 * | 11/2004 | Russell | 717/154 |
| 2009/0070746 | A1 * | 3/2009 | Dhurjati et al. | 717/128 |
| 2009/0077532 | A1 * | 3/2009 | Denney et al. | 717/106 |
| 2009/0125976 | A1 * | 5/2009 | Wassermann et al. | 726/1 |
| 2010/0083218 | A1 * | 4/2010 | Bender | 717/106 |
| 2010/0083240 | A1 * | 4/2010 | Siman | 717/144 |
| 2011/0078666 | A1 * | 3/2011 | Altekar | 717/131 |

OTHER PUBLICATIONS

Pargas et a;., "Test-Data Generation Using Genetic Algorithms", Journal of Software Testing, Verification and Reliability. 1999, pp. 1-19.*

* cited by examiner

*Primary Examiner* — Tuan Dam
*Assistant Examiner* — Zheng Wei

(57) ABSTRACT

A method for generating test cases for a program is disclosed. The method combines features of path-oriented and goal-oriented software testing. The illustrative embodiment constructs a control-flow graph with nodes that correspond to invocations of subroutines, and constructs control-flow graphs for the source code of such nodes as well. A metric that is based on the topology of the control-flow graph is evaluated recursively for nodes of the graph and for control-flow graphs that correspond to invoked subroutines. In the illustrative embodiment, the metric employed is the length of a shortest path from the starting node to a particular node. A node n with the highest metric value is then selected as a goal, and a path from the starting node to the ending node that passes through node n is generated via backtracking.

20 Claims, 12 Drawing Sheets

Figure 5

Table 510 for control-flow graph 200

| Node | Weight | Metric Value |
|------|--------|--------------|
| 201  | 5      | 9            |
| 202  | 1      | 9            |
| 203  | 2      | 14           |
| 204  | 1      | 15           |
| 205  | 1      | 14           |
| 206  | 1      | 14           |
| 207  | 1      | 14           |
| 208  | 2      | 37           |
| 209  | 1      | 14           |
| 210  | 3      | 9            |
| 218  | 21     | 37           |
| 228  | 1      | 37           |

Figure 7

Table 710 for control-flow graph 300

| Node | Updated Weight | Metric Value |
|------|----------------|--------------|
| 301  | 0              | 0            |
| 302  | 0              | 0            |
| 303  | 1              | 1            |
| 304  | 0              | 0            |
| 305  | 0              | 0            |
| 306  | 0              | 0            |

Table 810 for control-flow graph 200

| Node | Updated Weight | Metric Value |
|---|---|---|
| 201 | 0 | 0 |
| 202 | 0 | 0 |
| 203 | 0 | 0 |
| 204 | 0 | 0 |
| 205 | 0 | 0 |
| 206 | 1 | 1 |
| 207 | 0 | 0 |
| 208 | 0 | 1 |
| 209 | 0 | 0 |
| 210 | 0 | 0 |
| 218 | 1 | 1 |
| 228 | 0 | 1 |

Figure 8

CODE-COVERAGE GUIDED PRIORITIZED TEST GENERATION

FIELD OF THE INVENTION

The present invention relates to software engineering in general, and, more particularly, to automatic test generation from source code.

BACKGROUND OF THE INVENTION

As software gets more complex, so does testing the software to ensure that it works properly. As a result, software engineers have devised testing tools that facilitate the process of testing software.

Typically, a testing tool automatically generates sample inputs, known as test cases, for a program and then executes the program on each of the test cases, thereby enabling a human tester to compare the results of these test cases with the desired behavior. Testing tools that generate sample inputs based on an analysis of the source code of a program are known as whitebox tools, while testing tools that generate sample inputs without considering source code are known as blackbox tools.

Whitebox testing tools typically can be categorized into four classes. Random testing tools randomly generate test cases based on source code. Path-oriented testing tools identify a set of paths through the source code and generate appropriate test cases to cover the paths. Goal-oriented testing tools identify test cases that satisfy a selected goal (e.g., coverage of a particular statement in the source code, etc.), irrespective of the path that is traversed. Intelligent testing tools analyze the source code and identify potential error-prone sections of the program (e.g., a block of code that uses pointers extensively, etc.).

Path-oriented testing tools are advantageous because they can ensure that every line of code in a source program is executed by at least one test case. Path-oriented testing tools work by constructing a control-flow graph of a source program. A control-flow graph is a directed graph (N, A, s, X) where N is a set of nodes; $A \subseteq N \times N$ is a set of arcs; $S \in N$ is a unique starting node; and a proper subset $X \subset N$ of one or more ending nodes. Each node corresponds to a program block, which is a list of one or more program statements that are executed sequentially in deterministic fashion, and each arc corresponds to a control transfer from one program block to another. If more than one outgoing arc leaves a node, then each outgoing arc is labeled with a logical expression such that exactly one of the logical expressions is true for any given instantiation of variables. For example, three outgoing arcs from a node might be labeled $i<x$, $i=x$ and $i>x$, respectively.

FIG. 1 depicts the source code of an illustrative program, and control-flow graph 100 that corresponds to the program. Each node 101, 102, ..., 110 corresponds to one or more lines of code of the program, as indicated by the label of the node (e.g., node 101 corresponds to lines 1 through 5, etc.). The starting node, in this case node 101, is indicated by a double ellipse, and the single ending node, in this case node 110, is indicated by a triple ellipse. A labeled arc from a first node to a second node indicates the corresponding condition of the program that is necessary for a transition from the first node to the second node.

After constructing a control-flow graph, a path-oriented tool generates a set of paths from the starting node s to the ending node e such that all nodes in the control-flow graph are covered. A number of different techniques are known in the art to generate a test case for each generated path by assigning values to input variables accordingly. The source program can then be tested by executing the program for each test case and comparing the results with the expected behavior of the program.

SUMMARY OF THE INVENTION

The present invention is based on the observation that as programs become very large, checking all the test cases generated by path-oriented tools becomes intractable. The illustrative embodiment of the present invention combines features of the path-oriented approach with features of the goal-oriented approach to generate a manageable set of test cases that provides effective code coverage. In addition, the illustrative embodiment constructs a control-flow graph with nodes that correspond to invocations of subroutines (e.g., method calls in object-oriented languages such as Java, procedure calls in procedural languages such as C, function calls in functional programming languages such as Lisp, etc.) and constructs control-flow graphs for the source code of such nodes as well. By treating subroutine invocations in this manner, the illustrative embodiment is able to more accurately quantify the degree of code coverage of paths in the control-flow graph.

In the illustrative embodiment, a metric is evaluated for each node of a control-flow graph based on the topology of the control-flow graph, and recursively based on the topology of control-flow graphs that correspond to invoked subroutines. In the illustrative embodiment, the metric employed is the length of a shortest path from the starting node to a particular node. A node n with the highest metric value (i.e., the node whose shortest path is longer than any other node's shortest path) is then selected as a goal, and a path from the starting node to the ending node that passes through node n is generated via backtracking, thereby resulting in a path that passes through the most important node (i.e., the node with the largest metric value).

A test case corresponding to this path is then generated either by guiding the user in assigning values to variables, or by determining variable assignments automatically, or a combination of both. Subsequently, the metric for each node in the control-flow graph is re-evaluated based on the selected path. (In the illustrative embodiment, the metric for a node m of the control-flow graph is generalized to be the length of a shortest path from any node of a previously-generated path to node m.) A next-best path from the starting node to the ending node is then selected based on the updated values of the metric, and a second test case corresponding to this path is generated accordingly. The illustrative embodiment can similarly generate as many additional test cases as necessary, based on specified time constraints, desired percentage of code coverage, etc. After test cases have been generated, the test cases are executed in prioritized order, thereby improving the efficacy of testing schedules that are subject to time constraints.

The illustrative embodiment comprises: (a) generating a first path from the starting node of a control-flow graph to a goal node of the control-flow graph based on the values of a metric for two or more other nodes of the control-flow graph; (b) generating a second path from the goal node to the ending node of the control-flow graph; and (c) generating, based on the concatenation of the first path and the second path, a first test case for the program from which the control-flow graph is derived.

BRIEF DESCRIPTION OF THE DRAWINGS

FIG. 5 depicts a table of weights and metric values for each node of control-flow graph 200, as shown in FIG. 2, in accordance with the illustrative embodiment of the present invention.

FIG. 7 depicts a table of updated weights and metric values for each node of control-flow graph 300, in accordance with the illustrative embodiment of the present invention.

FIG. 8 depicts a table of updated weights and metric values for each node of control-flow graph 200, in accordance with the illustrative embodiment of the present invention.

DETAILED DESCRIPTION

Figure 1:
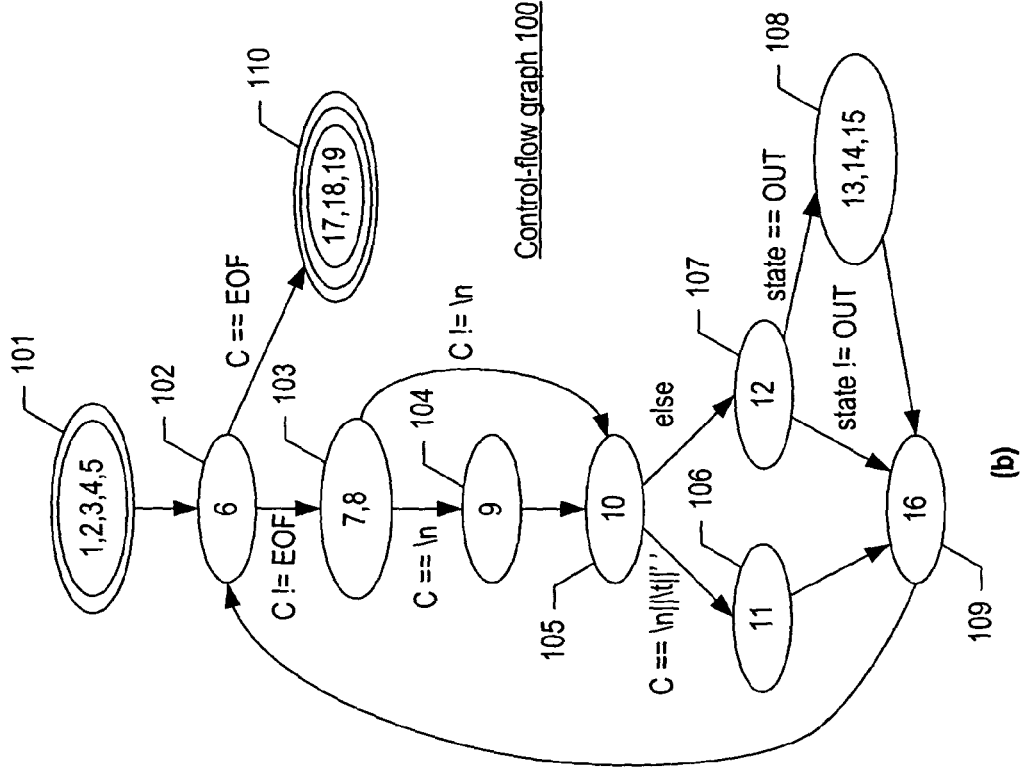
FIG. 1 depicts an illustrative program and a control-flow graph that corresponds to the program, in accordance with the prior art.
Figure 2:
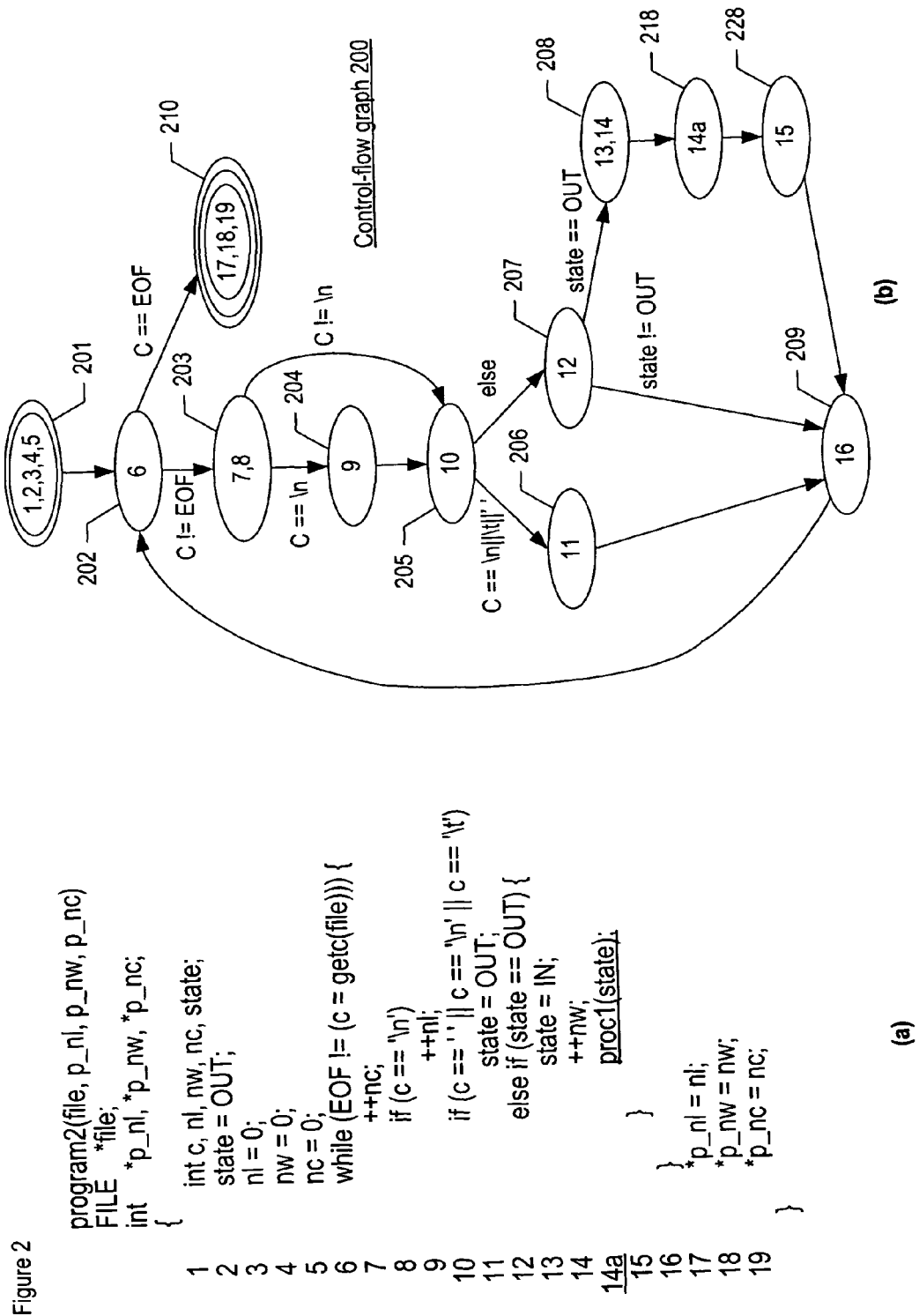
FIG. 2 depicts an illustrative program and a control-flow graph that corresponds to the program, in accordance with the illustrative embodiment of the present invention.

FIG. 2 depicts (a) an illustrative program and (b) control-flow graph 200 that corresponds to the program, in accordance with the illustrative embodiment of the present invention. The program of FIG. 2 is the same as the program of FIG. 1, except for an additional line of code, denoted line 14a, that comprises a subroutine call for a procedure proc1. Control-flow graph 200 is similar to control-flow graph 100, except that node 108 is replaced with three nodes: node 208, node 218, and 228. In accordance with the illustrative embodiment of the present invention, any line of code that invokes a subroutine is represented by a separate node, and thus lines 13, 14, and 15 are divided into two nodes: one node (208) comprising the lines of code that occur before the subroutine invocation (i.e., lines 13 and 14), and one node (228) comprising the lines of code that occur after the subroutine invocation (i.e., line 15). Node 218 represents line 14a and is accordingly positioned between nodes 208 and 228, as shown in FIG. 2.

Figure 3:
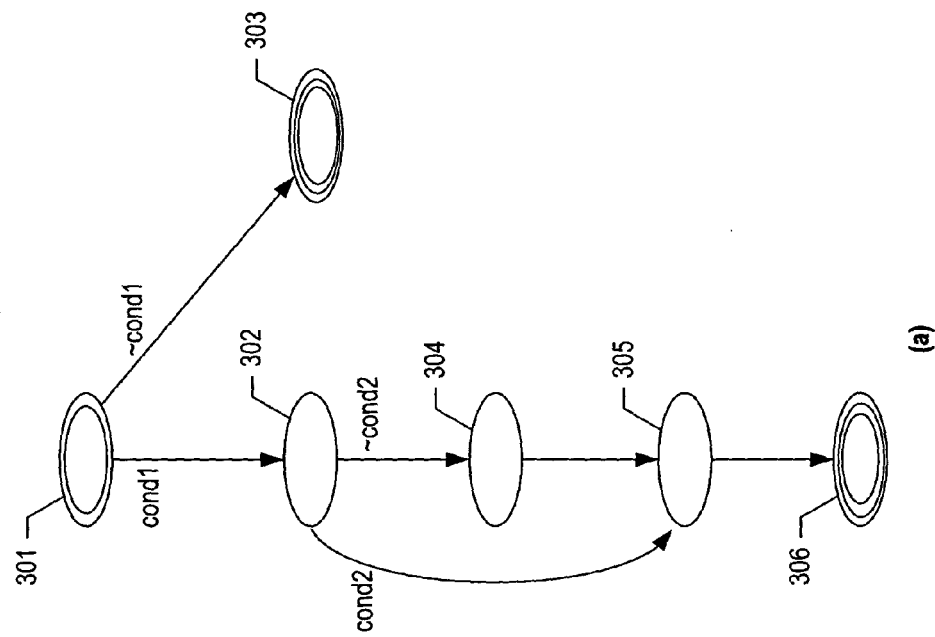
FIG. 3 depicts an illustrative control-flow graph that corresponds to a subroutine, and a table of weights and metric values for each node of the control-flow graph, in accordance with the illustrative embodiment of the present invention.

FIG. 3a depicts illustrative control-flow graph 300 that corresponds to subroutine proc1, in accordance with the illustrative embodiment of the present invention. As shown in FIG. 3a, control-flow graph 300 has six nodes 301 through 306, where node 301 is the starting node, and nodes 302 and 306 are ending nodes (for example, corresponding to two 'return' statements in proc1).

FIG. 3b depicts table 310, which comprises illustrative weights for nodes 301 through 306 of control-flow graph 300, where the weight of a node equals the number of lines of code of subroutine proc1 that the node represents. Table 310 also comprises values of a metric for each node that is based on the node weights. In the illustrative embodiment, the metric is based on the topology of the control-flow graph in addition to the weights. In particular, the value of the metric for a node n is the length of a shortest path from the starting node to an ending node that passes through node n, where the length of a path equals the sum of the weights of nodes along the path. For example, a shortest path that includes node 301 is the path consisting of nodes 301 and 303, and the length of this path is 3, the sum of the weights of nodes 301 and 303. Consequently, the value of the metric for node 301 is 3, and similarly, the value of the metric for node 303 is also 3. The metric values for the remaining nodes, as shown in the table, are determined in a similar fashion. As will be appreciated by those skilled in the art, it is well-known how to efficiently compute the lengths of shortest paths through a graph, and it will be clear how to modify such methods for graphs that have weights associated with nodes instead of arcs.

Figure 4:
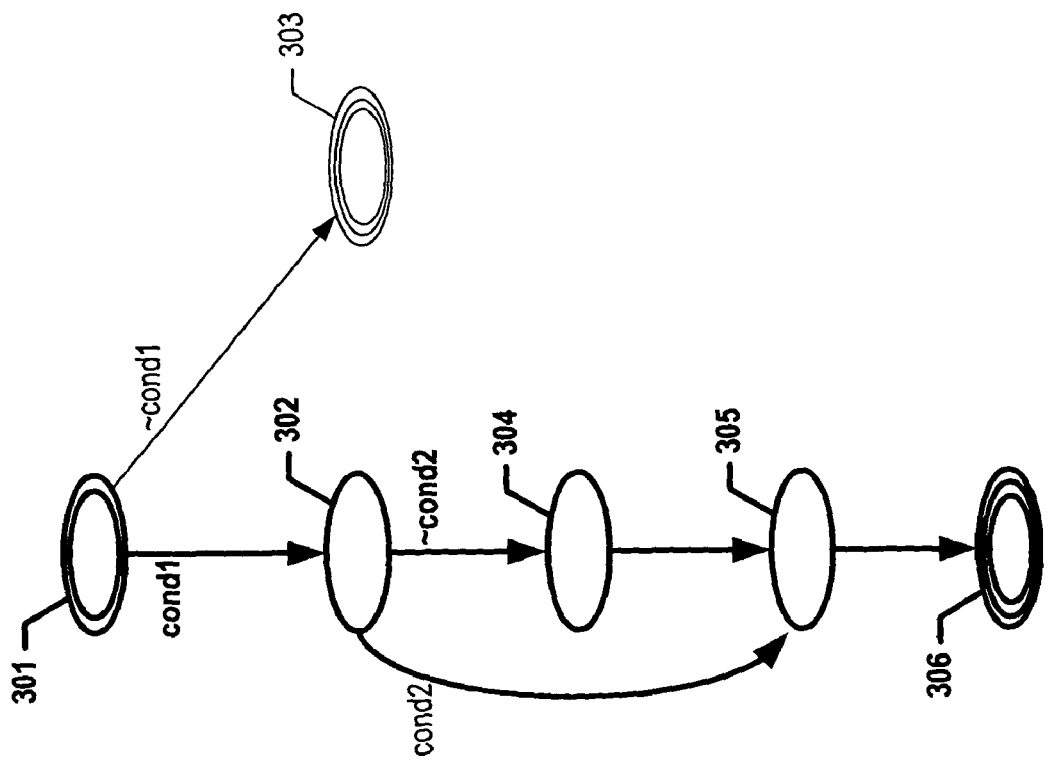
FIG. 4 depicts a path generated for control-flow graph 300, in accordance with the illustrative embodiment of the present invention.

As shown in table 310, node 304 has the highest metric value (21, as indicated in boldface), and thus it is selected as the goal node through which an execution path of subroutine prod must pass. FIG. 4 depicts such a path, as indicated by the boldface nodes and arcs.

In the case of control-flow graph 300, there is only one path from the starting node to an ending node that includes node 304. In general, however, there might be more than one such path. In the illustrative embodiment, a backtracking algorithm is employed to generate a path that includes a specified goal node, where the selection of nodes along the path is guided by their metric values. The path-generation algorithm is described in detail below and with respect to FIG. 13.

FIG. 5 depicts table 510, which comprises weights and metric values for each node of control-flow graph 200, in accordance with the illustrative embodiment of the present invention. With the exception of node 218, the weight of each node of control-flow graph 200 equals the number of lines of code of program2 represented by the node, just as was the case for control-flow graph 300. However, node 218, which invokes a subroutine, is instead assigned a weight equal to the metric value of the control-flow graph for that subroutine (i.e., control-flow graph 300). In the illustrative embodiment, the overall metric value for a control-flow graph is defined as the maximum metric value among the nodes of the control-flow graph. The maximum metric value for nodes of control-flow graph 300 is 21, and thus the overall metric value for control-flow graph 300 equals 21.

After the node weights for control-flow graph 200 are assigned, the metric values for each node is computed in the same manner as described above for control-flow graph 300; the results are shown in table 510. As shown in table 510, nodes 208, 218, and 228 have the maximum metric value of 38, as indicated in boldface, and thus any one of these three nodes can be selected as the goal node through which an execution path of program2 must pass.

Figure 6:
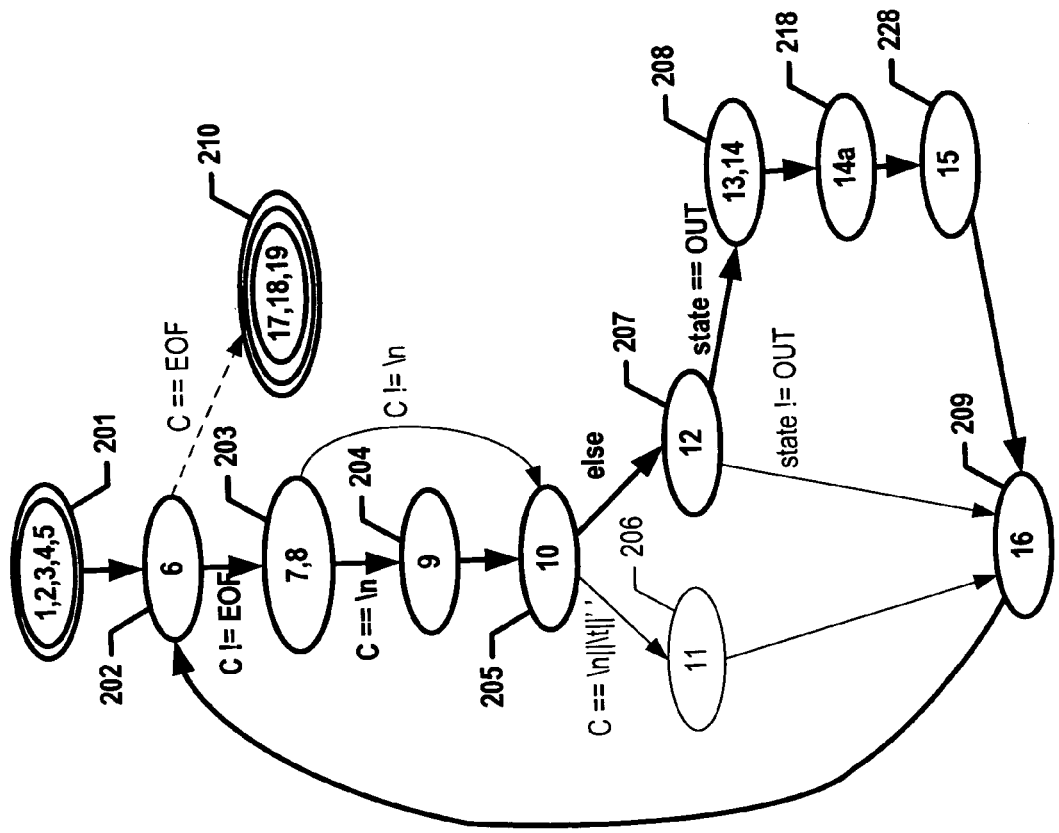
FIG. 6 depicts a path generated for control-flow graph 200, in accordance with the illustrative embodiment of the present invention.

FIG. 6 shows a path generated for control-flow graph 200. The arc transition from node 202 to ending node 210, which is the final segment of the path, is indicated by a dotted line instead of bold to distinguish from the first transition out of node 202 (to node 203). (The reason why node 204 is included in the path, rather than skipped over via the arc from node 203 to node 205, will become clear after reading the disclosure of the path-generation algorithm, which is described in detail below and with respect to FIG. 13.

The selection of a goal node in illustrative control-flow graph 200 turned out to be immaterial, since any choice will result in the path shown in FIG. 6 (i.e., the generated path includes all three candidate goal nodes). In some other control-flow graphs, however, different paths might be possible when there are two or more potential goal nodes (e.g., a first path might include only a first goal node and a second path might include only a second goal node, etc.) Moreover, although the path generated for control-flow graph 200 happens to include subroutine-invocation node 218, this is not always the case.

The entire path for a test case for program2 is therefore the union of the paths of FIG. 6 and FIG. 4. A test case corresponding to this entire path can then be generated by assigning values to input variables of program2 accordingly. If it is determined that the generated test case does not provide sufficient code coverage, an additional test case can be generated by updating the node weights and metrics of control-flow graphs 300 and 200 accordingly, and by subsequently employing the foregoing method to generate other paths in the control-flow graphs, as described below.

FIG. 7 depicts table 710 comprising updated weights and metric values for each node of control-flow graph 300, in accordance with the illustrative embodiment of the present invention. Each node that belongs to a previously-generated path (in this case, the path of FIG. 4) is assigned a new weight of zero, while the weights of nodes that do not belong to any previously-generated path remains unchanged. As shown in FIG. 7, node 303 has the highest metric value and thus is the new goal node, resulting in a new path {node 301, node 303}.

FIG. 8 depicts table 810 comprising updated weights and metric values for each node of control-flow graph 200, in accordance with the illustrative embodiment of the present invention. As in table 710, all nodes on the path of FIG. 6, with the exception of subroutine-invocation node 218, is assigned a new weight of zero. Node 218 is assigned the new maximum metric value of nodes in control-flow graph 300 (1, corresponding to node 303), and the weights of all other nodes of control-flow graph 200 (in this case node 306 only) remain unchanged.

Figure 9:
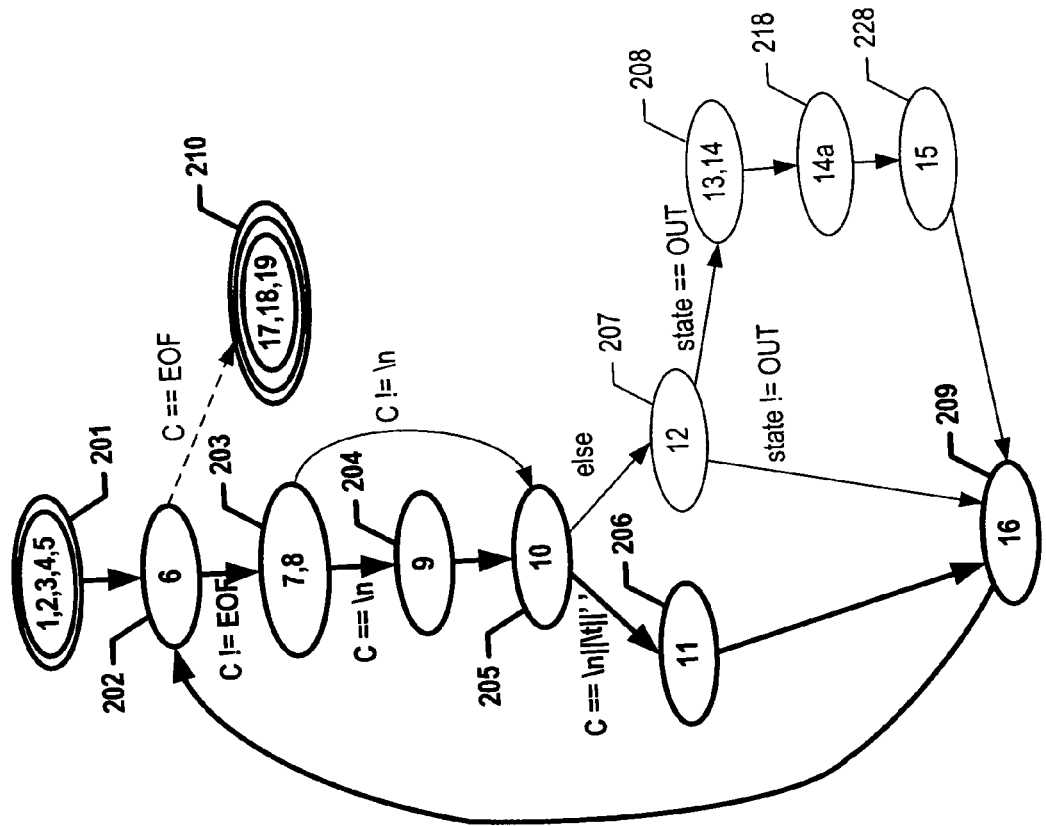
FIG. 9 depicts a second path generated for control-flow graph 200, in accordance with the illustrative embodiment of the present invention.

The metric values for each node in control-flow graph 200 are then updated accordingly based on the updated weights. As shown in FIG. 8, nodes 206, 208, 218 and 228 now have the largest metric value. If any of nodes 208, 218, or 228 are selected as the goal node, then the generated path for control-flow graph 200 will be the same as FIG. 6, and the entire path for the second test case will be the union of the path of FIG. 6 and the path {node 301, node 303}. If instead node 206 is selected as the goal node, then the entire path for the second test will be the path shown in FIG. 9.

Figure 10:
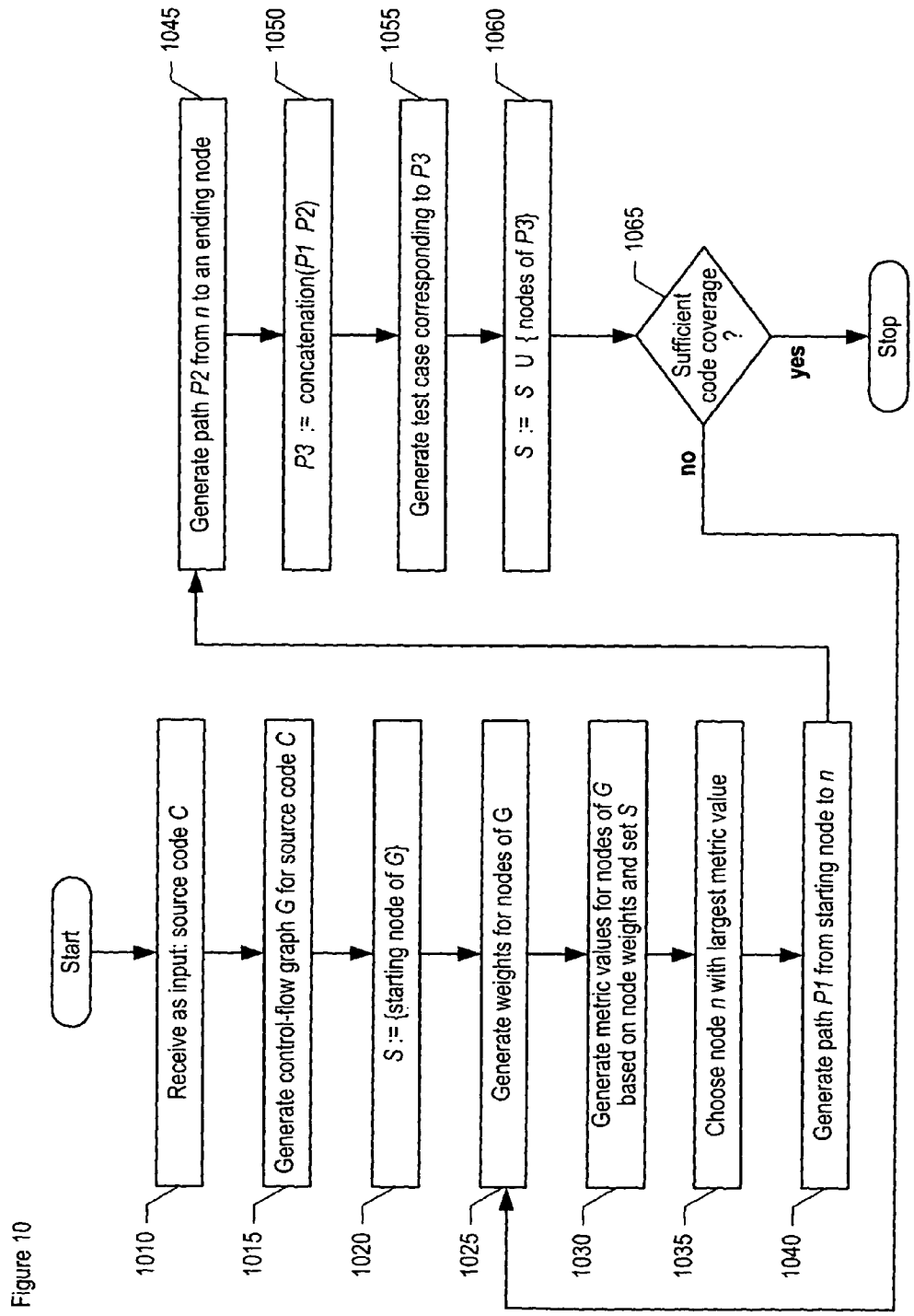
FIG. 10 depicts a flowchart of the salient tasks of the illustrative embodiment of the present invention.

FIG. 10 depicts a formal specification of the foregoing method in flowchart form. In accordance with the illustrative embodiment, the method of FIG. 10 is recursive, thereby enabling test cases to be generated for programs of arbitrary complexity (e.g., a program in which a first subroutine invokes a second subroutine and the second subroutine invokes the first subroutine, etc.). It will be clear to those skilled in the art which tasks depicted in FIG. 10 can be performed simultaneously or in a different order than that depicted.

At task 1010, source code C for a program or a subroutine is passed as input to the method of FIG. 10.

At task 1015, a control-flow graph G with separate nodes for subroutine invocations is generated from source code C, in well-known fashion.

At task 1020, set S is initialized as a singleton that contains the starting node of G.

At task 1025, weights for the nodes of G are generated, as described in detail below and with respect to the flowchart of FIG. 11.

At task 1030, metric values for nodes of G are generated, where the metric values are based on the node weights generated at task 1025 and on set S. As described above, the metric for a given node of G is the length of a shortest path to that node from any node in set S, where the length of a path is sum of the weights of the nodes on the path. Shortest-path algorithms are well-known in the art, and it will be clear to those skilled in the art how to use such an algorithm to compute the values of this metric for each node of G.

At task 1035, the node n of G that has the largest metric value is selected as the goal node. (Ties can be broken arbitrarily.)

At task 1040, a path P1 from the starting node of G to node n is generated, as described in detail below and with respect to the flowchart of FIG. 13.

At task 1045, a path P2 from node n to an ending node is generated in well-known fashion (e.g., depth-first search, breadth-first search, etc.).

At task 1050, variable P3 is set to the concatenation of paths P1 and P2.

At task 1055, a test case corresponding to path P3 is generated, in well-known fashion.

At task 1060, any nodes of path P3 that are not already in set S are added to S.

Task 1065 checks whether set S achieves sufficient code coverage, based on user-defined criteria such as percentage of lines of code covered, time constraints, etc. If the code coverage is determined to be insufficient, execution proceeds back to task 1025 for another iteration of the method; otherwise the method terminates.

Figure 11:
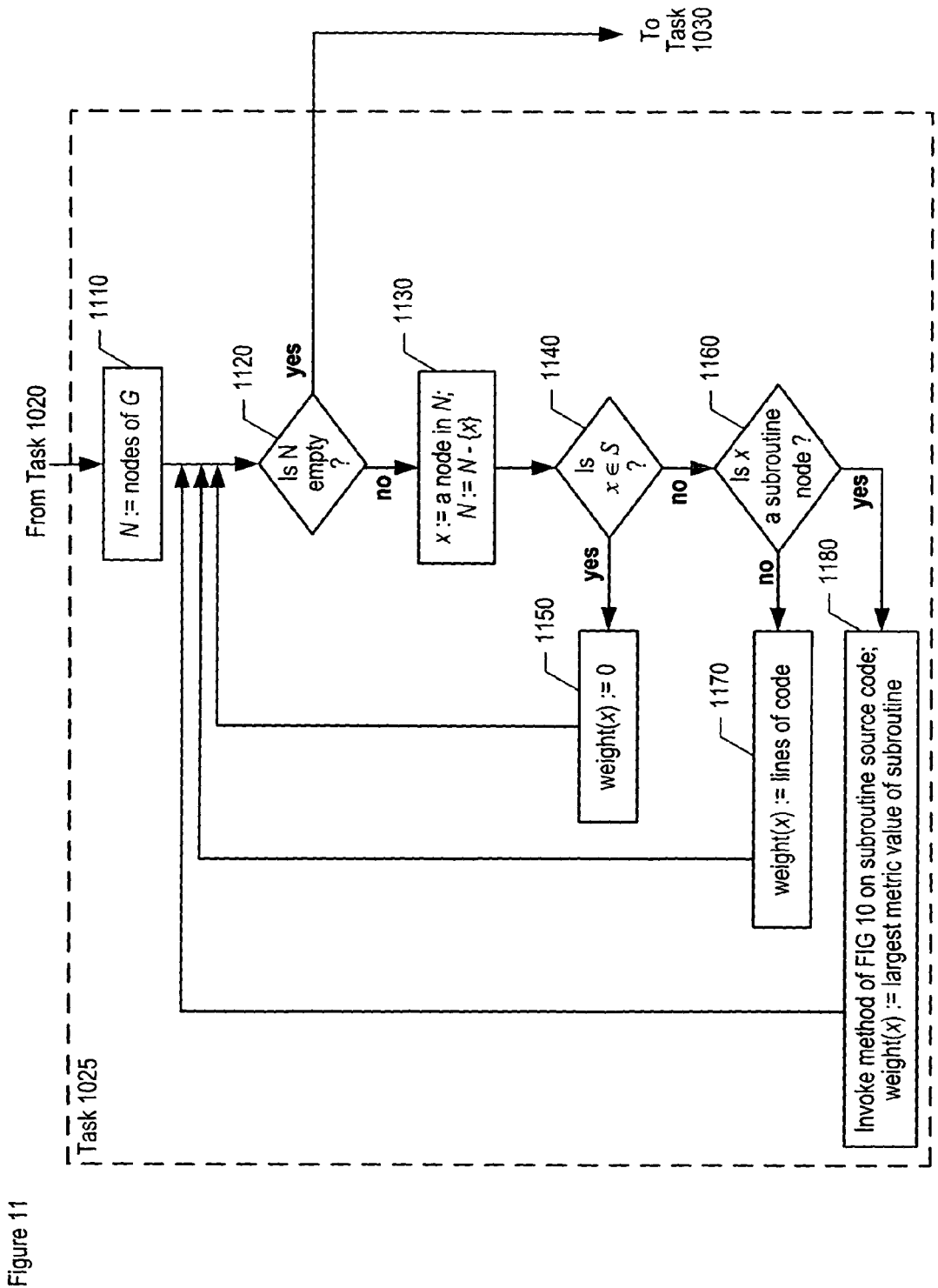
FIG. 11 depicts a detailed flowchart of task 1025, as shown in FIG. 10, in accordance with the illustrative embodiment of the present invention.

FIG. 11 depicts a detailed flowchart of task 1025 in accordance with the illustrative embodiment of the present invention. It will be clear to those skilled in the art which tasks depicted in FIG. 11 can be performed simultaneously or in a different order than that depicted.

At task 1110, variable N is initialized to the set of nodes of control-flow graph G.

Task 1120 checks whether set N is empty. If not, execution continues at task 1130; otherwise task 1025 is complete and execution continues at task 1030 of FIG. 10.

At task 1130, a node is removed from set N and stored in variable x.

Task 1140 checks whether node x is a member of set S. If it is, execution proceeds to task 1150; otherwise execution continues at task 1160.

At task 1150, the weight of node x is set to zero, and execution continues back at task 1120.

Task 1160 checks whether node x invokes a subroutine. If it does, execution continues at task 1180; otherwise execution continues at task 1170.

At task 1170, the weight of node x is set to the number of lines of code represented by node x, and execution continues back at task 1120.

At task 1180, the method of FIG. 10 is invoked recursively on the source code of the subroutine, and the weight of node x is set to the largest metric value in the control-flow graph corresponding to the subroutine. After task 1180 is completed, execution continues back at task 1120.

Figure 12:
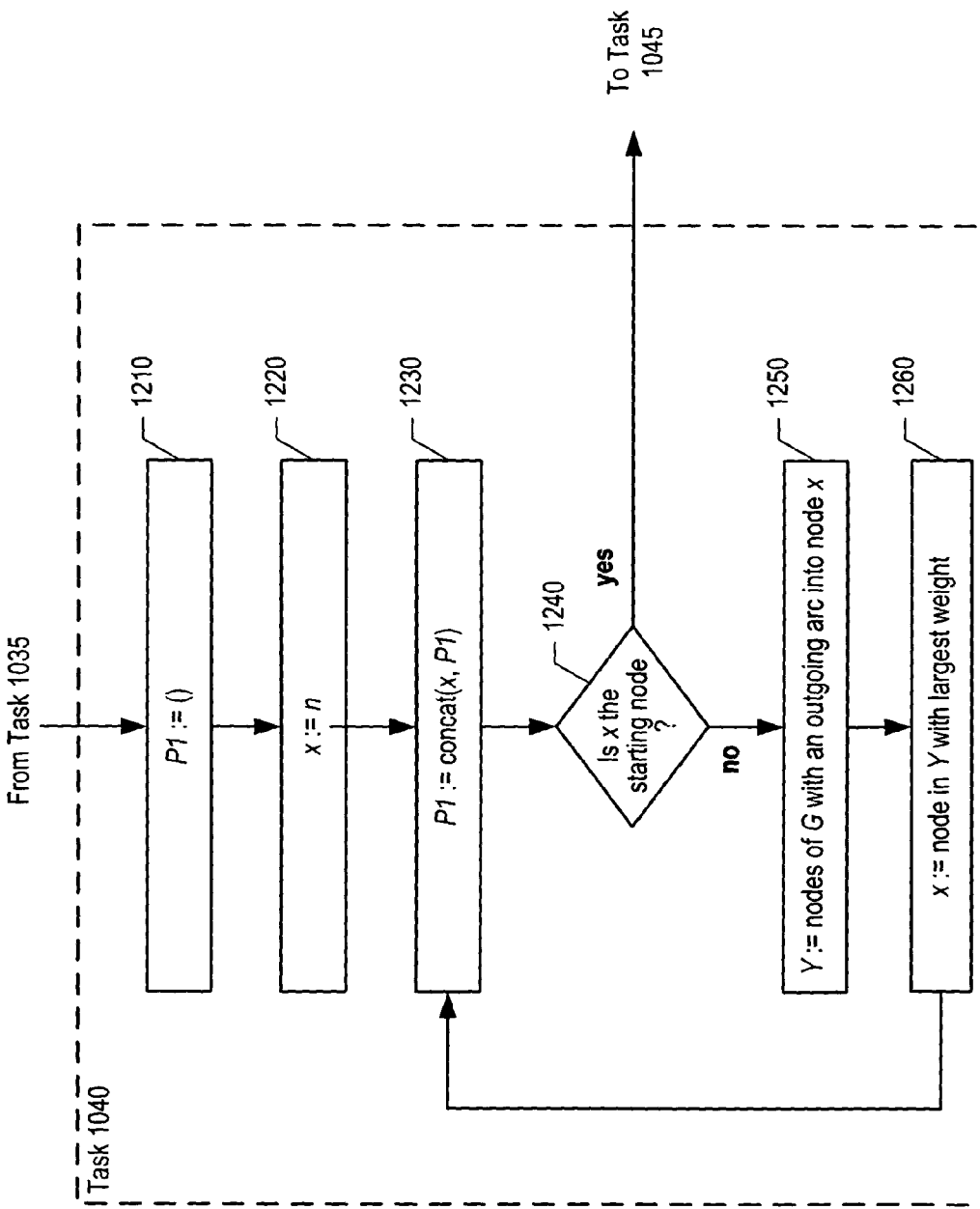
FIG. 12 depicts a detailed flowchart of task 1040, as shown in FIG. 10, in accordance with the illustrative embodiment of the present invention.

FIG. 12 depicts a detailed flowchart of task 1040 in accordance with the illustrative embodiment of the present invention. It will be clear to those skilled in the art which tasks depicted in FIG. 12 can be performed simultaneously or in a different order than that depicted.

At task 1210, P1 is initialized to an empty list.

At task 1220, variable x is initialized to node n.

At task 1230, node x is inserted at the front of P1.

Task 1240 checks whether node x is the starting node of control-flow graph G.

If it is not, execution proceeds to task 1250; otherwise task 1240 is complete and execution proceeds to task 1045 of FIG. 10.

At task 1250, the set of nodes of G that have an outgoing arc into node x is stored in variable Y.

At task 1260, x is set to the node in Y that has the largest weight. (Ties can be broken arbitrarily.) After task 1260, execution continues back at task 1230.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   (a) generating a first path from the starting node of a control-flow graph to a goal node of said control-flow graph based on the values of a metric for one or more other nodes of said control-flow graph;
   (b) generating a second path from said goal node to an ending node of said control-flow graph; and
   (c) generating, based on the concatenation of said first path and said second path, a first test case for the program from which said control-flow graph is derived.

2. The method of claim 1 wherein the value of said metric for said goal node is at least as great as for any other node in said control-flow graph.

3. The method of claim 1 wherein said metric is based on the topology of said control-flow graph.

4. The method of claim 3 wherein each node of said control-flow graph is associated with a corresponding weight; and wherein the value of said metric for at least one node of said control-flow graph is based on a weight associated with another node of said control-flow graph.

5. The method of claim 4 wherein the weight associated with a node of said control-flow graph equals the number of lines of code of said program represented by said node.

6. The method of claim 4 wherein said metric for a node of said control-flow graph is the length of a shortest path from the starting node of said control-flow graph to said node; and wherein the length of a path equals the sum of the weights of nodes on said path.

7. The method of claim 1 further comprising:
   (d) generating, based on said first path and said second path, updated values of said metric for nodes of said control-flow graph;
   (e) generating a third path from the starting node of said control-flow graph to an ending node of said control-flow graph, wherein said third path includes a node having the largest updated value; and
   (f) generating, based on said third path, a second test case for said program.

8. The method of claim 7 wherein each node of said control-flow graph is associated with a corresponding weight; and wherein said metric for a node n is the length of a shortest path to n from any node of a previously-generated path; and wherein the length of a path equals the sum of the weights of nodes on said path.

9. A method comprising:
   (a) generating a first control-flow graph that is based on a program, wherein said first control-flow graph comprises a node that represents a single line of code of said program that invokes a subroutine, and wherein said node has one or both of a single incoming arc and a single outgoing arc;
   (b) generating a first path from the starting node of said first control-flow graph to an ending node of said first control-flow graph; and
   (c) generating a first test case for said program based on said path.

10. The method of claim 9 wherein generating said first path is based on the values of a metric for nodes of said first control-flow graph.

11. The method of claim 10 wherein said metric is based on the topology of said first control-flow graph.

12. The method of claim 10 wherein each node of said first control-flow graph is associated with a corresponding weight; and
   wherein the weight associated with a node that lacks a subroutine invocation equals the number of lines of code of said program represented by said node; and
   wherein the weight associated with a node that invokes a subroutine equals the largest value of said metric among nodes of a second control-flow graph that is derived from said subroutine; and
   wherein the value of said metric for at least one node of said first control-flow graph is based on a weight associated with another node of said first control-flow graph.

13. The method of claim 12 wherein each node of a control-flow graph is associated with a corresponding weight; and wherein said metric for a node of a control-flow graph is the length of a shortest path from the starting node of said control-flow graph to said node; and wherein the length of a path equals the sum of the weights of nodes on said path.

14. The method of claim 12 wherein each node of said first control-flow graph is associated with a corresponding weight, said method further comprising:
   (d) generating updated values of said metric for nodes of said second control-flow graph;
   (e) generating, based on at least one of said updated values of said second control-flow graph, an updated weight for the node of said first control-flow graph that corresponds to said second control-flow graph;
   (f) generating updated values of said metric for nodes of said first control-flow graph based on said first path and on said updated weight;
   (g) generating a second path from the starting node of said first control-flow graph to an ending node of said first control-flow graph, wherein said second path includes a node of said first control-flow graph having the largest updated value; and (h) generating, based on said second path, a second test case for said program.

15. The method of claim 14 wherein said metric for a node n of said first control-flow graph is the length of a shortest path to n from any node of a previously-generated path; and wherein the length of a path equals the sum of the weights of nodes on said path.

16. A method comprising:
(a) generating a first control-flow graph that is based on a subroutine of a program;
(b) generating a second control-flow graph that is based on said program, wherein said second control-flow graph comprises a node n that represents a single line of code of said program that invokes said subroutine, and wherein node n has one or both of a single incoming arc and a single outgoing arc;
(c) generating a first path from the starting node of said first control-flow graph to an ending node of said first control-flow graph;
(d) generating a second path from the starting node of said second control-flow graph to an ending node of said second control-flow graph that includes node n; and
(e) generating a first test case for said program based on said first path and on said second path.

17. The method of claim 16 wherein generating said first path is based on the values of a metric for nodes of said first control-flow graph; and wherein generating said second path is based on the values of said metric for nodes of said second control-flow graph.

18. The method of claim 17 wherein said metric for a node of a control-flow graph is based on the topology of said control-flow graph.

19. The method of claim 17 wherein said metric for a node of a control-flow graph is the length of a shortest path from the starting node of said control-flow graph to said node; and wherein each node of said control-flow graph is associated with a corresponding weight; and wherein the length of a path equals the sum of the weights of nodes on said path.

20. The method of claim 17 wherein each node of said second control-flow graph is associated with a corresponding weight; and wherein the weight of a first node of said second control-flow graph equals the largest value of said metric among nodes of said first control-flow graph; and wherein the weight of a second node of said second control-flow graph equals the number of lines of code of said program represented by second node; and wherein said metric for a node of said second control-flow graph is based on at least one weight associated with another node of said second control-flow graph.

* * * * *